United States Patent [19]

Bury

[11] Patent Number: 4,461,059
[45] Date of Patent: Jul. 24, 1984

[54] DROP WIRE CLAMP

[75] Inventor: George J. Bury, Lake Villa, Ill.

[73] Assignee: Illinois Tool Works Inc., Chicago, Ill.

[21] Appl. No.: 362,222

[22] Filed: Mar. 26, 1982

[51] Int. Cl.³ ............................................. F16G 11/02
[52] U.S. Cl. ................. 24/129 R; 248/74.3;
    403/213; 24/115 R
[58] Field of Search ............ 24/115 R, 115 A, 115 G,
    24/115 H, 115 J, 121, 122.6, 129 R, 129 B, 129
    A, 129 W, 130, 134 KA; 339/103; 403/374,
    211, 212, 213; 248/74 B

[56] References Cited

U.S. PATENT DOCUMENTS

| 545,760 | 9/1895 | Ashley | 24/136 R |
| 887,520 | 5/1908 | Rehling | 24/129 R |
| 942,007 | 11/1909 | Morrill | 24/129 R |
| 1,759,485 | 5/1930 | LePage | 24/115 R |
| 1,902,459 | 3/1933 | Miller | 24/115 J |
| 2,781,212 | 2/1957 | Jugle | 403/213 |
| 3,164,874 | 1/1965 | Reark | 24/129 R |
| 3,550,923 | 12/1970 | Boos | 29/451 |
| 3,629,909 | 12/1971 | Riley | 24/130 |
| 3,897,161 | 7/1975 | Reinwall | 403/211 |
| 4,124,922 | 1/1978 | Speedie | 24/115 |

Primary Examiner—Gene Mancene
Assistant Examiner—Kris R. Schulze
Attorney, Agent, or Firm—Thomas W. Buckman; John P. O'Brien; David I. Roche

[57] ABSTRACT

A unitary, integrally formed wire clamp comprises an elongate, open-ended housing having a generally U-shaped cross-section for receiving a wire therein and a restraining web integrally formed in the housing for restraining axial movement of said wire in an axial direction opposite the first axial direction. The elongate housing comprises a bottom wall and a pair of substantially parallel side walls, and the restraining web comprises a plurality of spaced apart, substantially parallel rib members extending angularly inwardly of each of said side walls toward the opposite axial direction.

9 Claims, 5 Drawing Figures

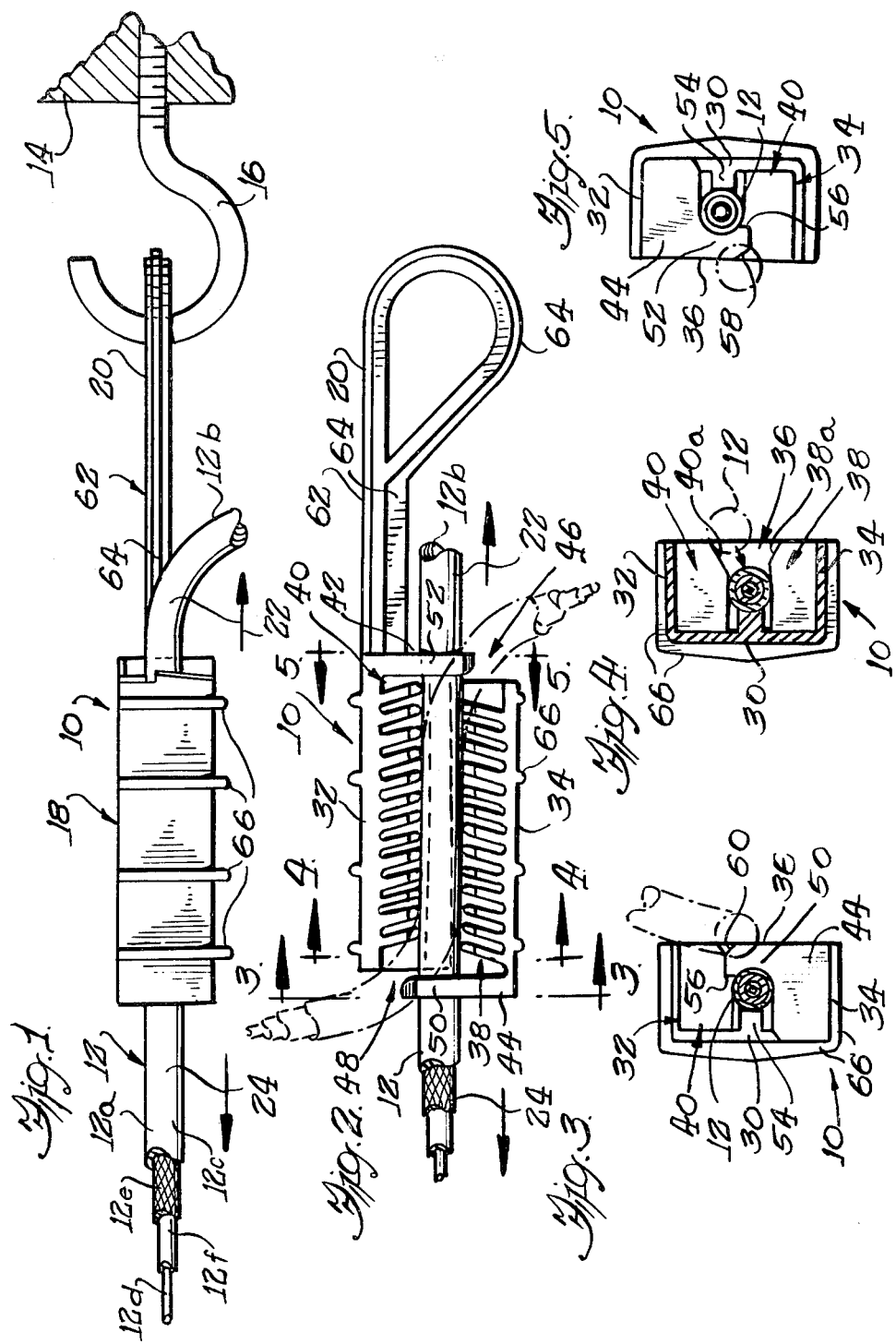

DROP WIRE CLAMP

BACKGROUND OF THE INVENTION

The present invention is directed generally to wire clamps, and more particularly to a wire clamp for retaining electrical installation wire such as a drop wire for telephone or coaxial cable for television service.

The wire clamp of the invention advantageously permits axial movement of the retained wire or cable in but a single direction, for example to permit adjustment of tension on the wire or cable, while opposing axial movement in the other direction, to thereby maintain the tension imparted to the wire or cable.

The prior art has proposed a number of devices for use as drop wire clamps. Heretofore, such clamps have frequently been of metallic construction, and hence relatively expensive to construct and install. The prior art has also proposed relatively less expensive clamps of plastics materials for this purpose. However, the prior art clamps heretofore in use have generally provided two or more interfitting clamping components for achieving restraint of a wire or cable in but one axial direction, while permitting movement as for tensioning, in the opposite direction. Hence, some difficulty may be encountered in properly installing such a multi-piece clamping device upon a given wire or cable.

Moreover, many of the prior art devices of the foregoing type become relatively permanently engaged with the wire once the installation and desired tensioning is accomplished. Hence, removal of the wire for replacement thereof, or replacement of the clamping device, should either become damaged while in service, is relatively difficult.

OBJECTS AND SUMMARY OF THE INVENTION

Accordingly, it is a general object of the invention to provide an improved wire clamping device which substantially avoids the problems of the prior art.

A more specific object is to provide a novel and improved drop wire clamp which may be integrally formed from a suitable plastics material in a relatively simple and inexpensive molding or similar operation.

A related object is to provide a wire clamp of the foregoing type which permits axial movement of a retained wire in but a single direction, thereby to permit tensioning of the wire while maintaining such tensioning once accomplished.

A further object is to provide a wire clamp of the foregoing type which readily receives a wire to be installed therein and yet positively retains the wire against removal once installed, while yet permitting relatively simple removal of the retained wire when desired.

An important object is to provide a wire clamp which retains a coaxial cable against axial movement in one direction by a plurality of inclined webs without substantially effecting the impedance in the cable.

A related object is to provide a wire clamp of the foregoing type which is relatively simple and inexpensive in its manufacture and installation, yet is highly reliable in operation.

A unitary, integrally formed wire clamp comprises an elongate, open ended housing having a generally U-shaped cross-section for receiving a wire therein and restraining means integrally formed in said housing for restraining axial movement of said wire in a first axial direction while permitting axial movement of said wire in an axial direction opposite said first axial direction.

BRIEF DESCRIPTION OF THE DRAWINGS

The foregoing as well as other objects, features and advantages for the invention will become more readily apparent upon consideration of the following detailed description of the illustrated embodiment, together with reference to the drawings, wherein:

FIG. 1 is a side elevation of the drop wire clamp of the invention in use;

FIG. 2 is a top plan view of the drop wire clamp of FIG. 1, further illustrating installation of a wire therein;

FIG. 3 is a sectional view taken substantially along the line 3—3 of FIG. 2;

FIG. 4 is a sectional view taken substantially along the line 4—4 of FIG. 2; and FIG. 5 is a sectional view taken substantially along the line 5—5 of FIG. 2.

DETAILED DESCRIPTION OF THE ILLUSTRATED EMBODIMENT

Referring now to the drawings and initially to FIG. 1, a drop wire clamp according to the invention is designated generally by the reference numeral 10. In FIG. 1, the drop wire clamp 10 is illustrated in use, for securing a typical wire or cable 12 with respect to a stationary surface 14. In a typical installation as illustrated in FIG. 1, the surface 14 may be a generally vertical wall surface of a building or the like. Hence, a suitable hook 16 or similar fastener may be secured to the wall 14 to receive the drop wire clamp 10 of the invention.

In this latter regard, the drop wire clamp 10 generally includes a housing portion designated generally by the reference numeral 18 and an axially outwardly extending loop portion 20 for pivotal engagement with the hook or other securing device 16. This loop 20 is molded or otherwise formed integrally with the housing 10.

In accordance with a feature of the invention, and as will be more fully described later herein, the drop wire clamp 10 advantageously permits movement of the wire 12 in a first axial direction, as indicated by the arrow 22, while opposing movement in the opposite axial direction, as indicated by the arrow 24. Consequently, the drop wire clamp 10 of the invention facilitates tensioning of the wire 12, and specifically, tensioning of a remote portion 12a thereof while retaining such tension once effected. In a typical installation, it is generally desirable for an inner or proximate portion 12b of the wire 12 to provide sufficient slack or axial length for suitable coupling with equipment interiorly of the surface 14. However, the portion 12a of the wire 12 is generally to be retained with a given amount of tension, for example between the building surface 14 and a remote utility pole or the like.

Referring now also to the remaining Figures of the drawings, the housing 10 comprises a bottom wall portion 30 which supports a pair of substantially parallel and opposingly facing side wall portions 32 and 34. Together, this bottom wall portion 30 and the depending side wall portions 32 and 34 define a generally U-shaped cross-section of the housing 10. Hence, this U-shaped housing 10 defines an open top portion 36 for receiving a wire or cable such as the cable 12. In this regard, it will be noted that the cable 12 illustrated in the drawings comprises a coaxial cable of the type well known in the art.

As mentioned above, the housing is provided with suitable integrally formed structure for generally restraining axial movement of the wire 12 in the axial direction 24 while permitting movement thereof in the opposite axial direction 22. In the illustrated embodiment, this structure comprises a pair of similar, inwardly extending web structures designated generally by the reference numerals 38 and 40 which depend inwardly from the respective side walls 32, 34. Moreover, as best viewed in FIG. 2, these webs 38 and 40 extend in an angular direction, being angled from their respective side walls 34 and 34 generally toward the axial direction 22. Hence, these webs 38 and 40 act to oppose axial movement of the wire or cable 12 in the axial direction 24 while permitting movement thereof in the axial direction 22.

In the illustrated embodiment, these angularly inwardly extending webs 38 and 40 each comprises a plurality of substantially parallel and spaced apart rib members integrally formed with the housing 10. Advantageously, the axially innermost surfaces of these ribs or web members 38, 40 are spaced apart by dimensions substantially similar to the cross-sectional dimension of the wire or cable 12. Preferably, these parallel and spaced apart ribs 38 and 40 are all of substantially equal thickness and define substantially equal spacings or gaps therebetween. However, different numbers, relative sizes and spacings of these web portions or ribs 38, 40 may be utilized without departing from the invention. The critical distance between the webs 38, 40 is, as indicated above, substantially equal to the cross-sectional dimension of the wire or cable 12. Preferably the spacing is slightly less then the cross-sectional dimension to thereby engage the ends of the webs 38, 40 with the cover 12c of a coaxial cable without appreciably effecting the distance established by the space maintainer 12f between the cable core 12d and the shielding structure 12e.

Each of the inwardly extending web structures 38, 40, as described above and seen in the drawings, includes a plurality of webs extending angularly inwardly from each side wall 32, 34 and preferably engages a coaxial cable 12 retained thereby in a manner such that the impedance in the cable is substantially unaffected. The multiplicity of inwardly directed webs each engaging the coaxial cable 12 at slightly spaced locations axially therealong spreads the retaining force over the entire portion of the cable engaged by the clamp 10. Accordingly, the disruption of the critical spacing established by the insulating space maintainer 12f, between the cable core 12d and the shielding structure 12e, is minimized due to the retaining force being spread out over a segment of the cable, i.e., the impedance in the cable will be substantially unaffected. Whereas, if the force were localized at a particular point or a vary small area the critical spacing as well as the impedance would be seriously effected.

In accordance with a further feature of the invention, the housing 10 is provided with partially enclosed end wall portions 42 and 44. Moreover, each of these end walls 42, 44 extends partially across the cross-sectional width of the housing 10 from a respective one of the side wall portions 32, 34. That is , the end wall 42 extends outwardly from the side wall 32 leaving a space or gap 46 between its outermost extent or surface and the opposite side wall 34. Similarly, the opposite end wall 44 extends outwardly from the side wall 30 for leaving a similar gap or opening 48 between its outermost extent or surface in the opposite side wall 32. These gaps or openings 46 and 48 advantageously facilitate insertion of the wire or cable 12 into the housing 10 from the top portion 36 thereof.

In accordance with yet a further feature of the invention, each of the partial end wall portions 42 and 44 defines a substantially hook-like member or portion 50 (see FIG. 3) and 52 (see FIG. 5) which is spaced apart from the inner surface of the bottom wall portion 30 of the housing 10. These look-like portions 50, 52 advantageously aid in retaining a wire or cable 12 retained in the housing 10 by opposing movement thereof in a generally upward direction.

Cooperatively, the housing bottom wall 30 includes a substantially centrally disposed longitudinal raised rib member or portion 54 whose upper surface is spaced from the lower surface of the respective hook-like members 50, 52 by a dimension substantially similar to the cross-sectional dimension of the wire 12 to be retained therein. This rib member 54 is advantageously of lesser width or cross-sectional dimension than the wire or cable 12 and is substantially centered within the housing 10. Accordingly, lowermost surfaces 56, 58 of the hook-like portions 50 and 52 are spaced apart from the ridge 54 and from the inner surface of the bottom wall 30. This spacing is sufficient to permit relatively simple manipulation of the wire or cable 12 therethrough for insertion into the housing, to assume a generally coaxial position therein as illustrated in FIGS. 3, 4 and 5.

To further facilitate the insertion of the wire or cable 12 into the housing 10, each of the ribs forming the webs 38 and 40 is relieved in a generally axially outward and downward direction with respect to the top portion 36 of the housing 10 to define surfaces indicated by reference numerals 38a and 40a. Hence, placement and guidance of the wire or cable 12 is greatly facilitated by these relieved surfaces 38a and 40a during insertion of the wire or cable 12 into the housing 10. Further in this regard, an upper, outer edge surface of each of the hook-like portions 50 and 52 is also relieved in a complementary fashion as indicated generally at reference numeral 60 to facilitate passage of a wire or cable 12 thereby during insertion into the housing 10.

From the foregoing descriptions, it will be recognized that the cooperative structure of the various elements of the housing 10 permits insertion of a wire or cable 12 from an upper side 36 thereof relatively simply and easily. However, these same structures further cooperate to oppose removal of the wire or cable 12 from the housing 10 once it has been inserted into the generally coaxial position therein illustrated in the drawings. To aid in an understanding of this insertion procedure, the relative position of the wire or cable 12 during insertion has been indicated in phantom line in FIGS. 2, 3, 4 and 5.

In accordance with a preferred form of the invention, the loop 20 is preferably integrally formed by molding or another suitable process with the housing 10. Moreover, this loop 20 preferably is formed at the end of an extension or leg 62 which extends from the side wall 32, so as not to interfere with the portion 12b of the wire, as best viewed in FIGS. 1 and 2.

Moreover, suitable strengthening ribs may be integrally molded with both the housing 10 and loop 20. Such ribs are indicated by the reference numerals 64 and 66.

While the invention has been illustrated and described herein with reference to a preferred embodiment, the invention is not limited thereto. Those skilled in the art may devise various alternatives, changes and modifications upon reading the foregoing descriptions. The invention includes such alternatives, changes and modifications insofar as they fall within the spirit and scope of the appended claims.

The invention is claimed as follows:

1. A unitary, integrally formed wire clamp comprising: an elongate, open-ended housing having a generally U-shaped cross-section for receiving a wire therein, restraining means integrally formed in said housing for restraining axial movement of said wire in a first axial direction while permitting axial movement of said wire in an axial direction opposite said first axial direction, and each of the axially outermost ends of said open-ended housing including means for engagement over said wire for opposing removal of said wire from said U-shaped housing in a generally upward direction, and said elongate housing including a bottom wall and a pair of substantially parallel side walls, said bottom wall and said side walls together defining a U-shaped cross-section, said bottom wall further includes an integrally formed raised rib portion substantially coaxially aligned with said means for engagement over said wire for urging said wire into retaining engagement beneath said engagement means, an uppermost surface of said rib portion being spaced apart from the lowermost extremity of said engagement means by an amount at least as great as the cross-sectional dimension of said wire to permit said wire to be received therebetween.

2. A unitary, integrally formed wire clamp comprising: an elongate, open-ended housing having a generally U-shaped cross-section for receiving wire therein, restraining means integrally formed in said housing for restraining axial movement of said wire in a first axial direction while permitting axial movement of said wire in an axial direction opposite said first axial direction, and a partial end wall at each of the axially outermost ends of said open-ended housing, each said partial end walls further defining an axially inwardly extending hook-like portion for engagement over said wire for opposing removal of said wire from said U-shaped housing in a generally upward direction.

3. A wire clamp according to claim 2 wherein each of said hook-like portions projects from a respective one of the side walls, and defines an outer edge surface spaced apart from the one of said side walls opposite that side wall from which it projects, thereby defining end wall openings in said housing for receiving said wire therethrough.

4. A wire clamp according to claim 3 wherein each of said hook-like portions is spaced above said bottom wall by a dimension at least equal to the cross-section of said wire to facilitate insertion of said wire thereunder.

5. A wire clamp according to claim 4 wherein said bottom wall further includes an integrally formed raised rib portion substantially coaxially aligned with said hook-like portion for urging said wire into retaining engagement beneath said hook-like portion, an uppermost surface of said rib portion being spaced apart from the lowermost extremity of said hook-like portion by an amount at least as great as the cross-sectional dimension of said wire to permit said wire to be received therebetween.

6. A unitary, integrally formed wire clamp comprising: an elongate, open-ended housing comprising a bottom wall and a pair of substantially parallel side walls, said bottom wall and said side walls together defining a substantially U-shaped cross-section for receiving a wire therein and restraining web means integrally formed in said housing for restraining axial movement of said wire in a first axial direction while permitting axial movement of said wire in an axial direction opposite said first axial direction, said web means projects angularly inwardly from the respective side walls toward said opposite axial direction and comprises a plurality of spaced apart, substantially parallel rib members extending angularly inwardly of each of said side walls and said housing further includes a partial end wall at each of the axially outermost ends thereof, each said partial end wall further defining an axially inwardly extending hook-like portion for engagement over said wire for opposing removal of said wire from said U-shaped housing in a generally upward direction.

7. A wire clamp according to claim 6 wherein each of said hook-like portions projects from a respective one of the side walls, and defines an outer edge surface spaced apart from the one of said side walls opposite that side wall from which it projects, thereby defining end wall openings in said housing for receiving said wire therethrough.

8. A wire clamp according to claim 7 wherein each of said hook-like portions is spaced above said bottom wall by a dimension at least equal to the cross-section of said wire to facilitate insertion of said wire thereunder.

9. A wire clamp according to claim 8 wherein said bottom wall further includes an integrally formed raised rib portion substantially coaxially aligned with said hook-like portion for urging said wire into retaining engagement beneath said hook-like portion, an uppermost surface of said rib portion being spaced apart from the lowermost extremity of said hook-like portion by an amount at least as great as the cross-sectional dimension of said wire to permit said wire to be received therebetween.

* * * * *